US012623978B2

(12) United States Patent (10) Patent No.: US 12,623,978 B2
Severson (45) Date of Patent: *May 12, 2026

(54) PROCESSES AND SYSTEMS FOR PRODUCING AMMONIA PRODUCTS AND/OR CALCIUM CARBONATE PRODUCTS

(71) Applicant: M.A.R.G., LLC, Valparaiso, IN (US)

(72) Inventor: Scott Severson, Valparaiso, IN (US)

(73) Assignee: M.A.R.G., LLC, Valparaiso, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/665,980

(22) Filed: May 16, 2024

(65) Prior Publication Data

US 2024/0300865 A1     Sep. 12, 2024

Related U.S. Application Data

(62) Division of application No. 17/096,533, filed on Nov. 12, 2020, now Pat. No. 11,999,664.

(Continued)

(51) Int. Cl.
C05C 11/00          (2006.01)
C05F 3/00           (2006.01)
(Continued)

(52) U.S. Cl.
CPC ............... *C05C 11/00* (2013.01); *C05F 3/00* (2013.01); *C05F 5/002* (2013.01); *C05F 17/40* (2020.01); *C05F 17/971* (2020.01)

(58) Field of Classification Search
CPC . C05C 11/00; C05C 3/00; C05F 17/40; C05F 3/00; C05F 5/002; C05F 17/971; C05D 3/02; C05G 1/00; C05G 5/20
See application file for complete search history.

(56) References Cited

U.S. PATENT DOCUMENTS 5,616,163 A  *  4/1997  Halfter ...................... C05C 3/00
                                                            71/15
11,999,664 B2 *  6/2024  Severson .................. C05F 3/00
              (Continued)

FOREIGN PATENT DOCUMENTS

FR            2970883 A1 *  8/2012  .............. C05D 3/02

*Primary Examiner* — Wayne A Langel
(74) *Attorney, Agent, or Firm* — Hartman Global IP Law; Gary M. Hartman; Domenica N. S. Hartman

(57) ABSTRACT

Systems and processes for producing ammonia products and calcium carbonate products, the latter containing sequestered carbon dioxide, from an effluent derived from one or more organic feedstocks. Solids are removed from an organic feedstock that contains a nitrogen compound to produce an organic liquid effluent that contains ammonium and/or ammonia. Ammonia is stripped and concentrated from the organic liquid effluent to produce a gaseous mixture that contains ammonia and carbon dioxide, and the gaseous mixture is cooled to produce a condensed aqueous ammoniacal nitrogen solution of aqueous ammonia, ammonium bicarbonate, and/or ammonium carbonate. The condensed aqueous ammoniacal nitrogen solution is then contacted with a stabilizing agent to cause a reaction therebetween to produce at least a stabilized ammoniacal nitrogen product and calcium carbonate in which carbon dioxide captured in the ammonium bicarbonate and/or the ammonium carbonate is sequestered.

17 Claims, 4 Drawing Sheets

Related U.S. Application Data

(60) Provisional application No. 62/934,279, filed on Nov. 12, 2019.

(51) Int. Cl.
| | |
|---|---|
| *C05F 5/00* | (2006.01) |
| *C05F 17/40* | (2020.01) |
| *C05F 17/971* | (2020.01) |

(56) References Cited

U.S. PATENT DOCUMENTS

| | | | |
|---|---|---|---|
| 12,252,450 B2 * | 3/2025 | Severson | C05C 3/00 |
| 2006/0021407 A1 * | 2/2006 | Poudrette | C05F 3/00 |
| | | | 71/21 |
| 2019/0367382 A1 * | 12/2019 | Rapport | B01D 61/16 |
| 2022/0380270 A1 * | 12/2022 | Stemwedel | C05F 17/40 |
| 2024/0383765 A1 * | 11/2024 | Bassani | C02F 9/00 |

* cited by examiner

PROCESSES AND SYSTEMS FOR PRODUCING AMMONIA PRODUCTS AND/OR CALCIUM CARBONATE PRODUCTS

CROSS REFERENCE TO RELATED APPLICATIONS

This is a division patent application of co-pending U.S. patent application Ser. No. 17/096,533 filed Nov. 12, 2020, which claims the benefit of U.S. Provisional Application No. 62/934,279 filed Nov. 12, 2019. The contents of these prior applications are incorporated herein by reference.

BACKGROUND OF THE INVENTION

The present invention generally relates to systems and processes capable of producing ammonia products and/or calcium carbonate products, and in particular systems and processes capable of producing organic high sulfur liquid ammonium products and optionally organic calcium carbonate products from an effluent derived from one or more organic feedstocks.

High yields and healthy growth in food crops, gardens, and lawns require a high soil nitrogen content. High ammoniacal nitrogen fertilizers are commonly used to meet this need by delivering the necessary nitrogen directly to soil and crops. However, most high ammoniacal nitrogen fertilizers currently available are synthetic fertilizers which precludes them from being used to produce organic crops, one of the fastest-growing sectors of the agricultural economy. In the United States, organic crops are regulated by the National Organic Program (NOP) standards developed under the Organic Foods Production Act of 1990 (7 C.F.R. '205), and the term "organic crops" is used herein consistent with the NOP standards. By 2031, the demand for organic fertilizer with high nitrogen content is predicted to increase tenfold in the United States. Currently, very few companies offer an organic fertilizer that meets these needs.

Animal waste in the form of livestock manure has been a liability for large dairy farms and other Confined Animal Feeding Operations (CAFOs). Nutrients in manure, particularly in the liquid fraction (effluent) of manure, have the potential to leach into nearby bodies of water, producing a source of pollution and creating a major liability for animal feeding operations. Some processes, specifically anaerobic digestion and biogas production, have proved to be effective at removal of pathogens and harmful greenhouse gases from effluent. However, there are many shortcomings of these processes and many CAFOs continue to search for improved means for sustainably processing their effluent.

In view of the above, it can be appreciated that it would be desirable if systems and processes were available for producing high nitrogen content organic fertilizer, particularly from effluent derived from livestock manure.

BRIEF DESCRIPTION OF THE INVENTION

The present invention provides systems and processes capable of producing ammonia products and/or calcium carbonate products, including but not limited to an organic high sulfur liquid ammonium product and an organic calcium carbonate product from an effluent derived from one or more organic feedstocks.

According to one aspect of the invention, a process is provided that includes providing an organic feedstock that contains at least one nitrogen compound, removing solids from the organic feedstock to produce an organic liquid effluent that contains at least one of ammonium and ammonia, stripping and concentrating ammonia from the organic liquid effluent to produce a gaseous mixture that contains ammonia, cooling the gaseous mixture to produce a condensed aqueous ammoniacal nitrogen solution comprising one or more of aqueous ammonia, ammonium bicarbonate, and ammonium carbonate, and contacting the condensed aqueous ammoniacal nitrogen solution with a stabilizing agent to cause a reaction therebetween to produce at least a stabilized ammoniacal nitrogen product.

According to another aspect of the invention, a process is provided that includes preparing an organic feedstock that contains at least one nitrogen compound by causing organic animal manure and/or organic food waste to undergo anaerobic digestion, removing solids from the organic feedstock to produce an organic liquid effluent that contains at least one of ammonium and ammonia, stripping and concentrating ammonia from the organic liquid effluent to produce a gaseous mixture that contains ammonia, cooling the gaseous mixture to produce a condensed aqueous ammoniacal nitrogen solution comprising one or more of aqueous ammonia, ammonium bicarbonate, and ammonium carbonate, and contacting the condensed aqueous ammoniacal nitrogen solution with gypsum to cause a reaction therebetween and produce calcium carbonate and at least a stabilized ammoniacal nitrogen product that contains ammonium sulfate.

According to another aspect of the invention, a system is provided that includes a filtration system configured to remove solids from an organic feedstock that contains at least one nitrogen compound and produce an organic liquid effluent that contains at least one of ammonium and ammonia, means for stripping and concentrating ammonia from the organic liquid effluent to produce a gaseous mixture that contains ammonia, means for cooling the gaseous mixture to produce a condensed aqueous ammoniacal nitrogen solution comprising one or more of aqueous ammonia, ammonium bicarbonate, and ammonium carbonate, and means for reacting a stabilizing agent with the condensed aqueous ammoniacal nitrogen solution to produce a stabilized ammoniacal nitrogen product.

Technical effects of the processes and system described above preferably include the ability to produce high nitrogen content organic fertilizers from organic effluents.

Other aspects and advantages of this invention will be appreciated from the following detailed description.

DETAILED DESCRIPTION OF THE INVENTION

Figure 1:
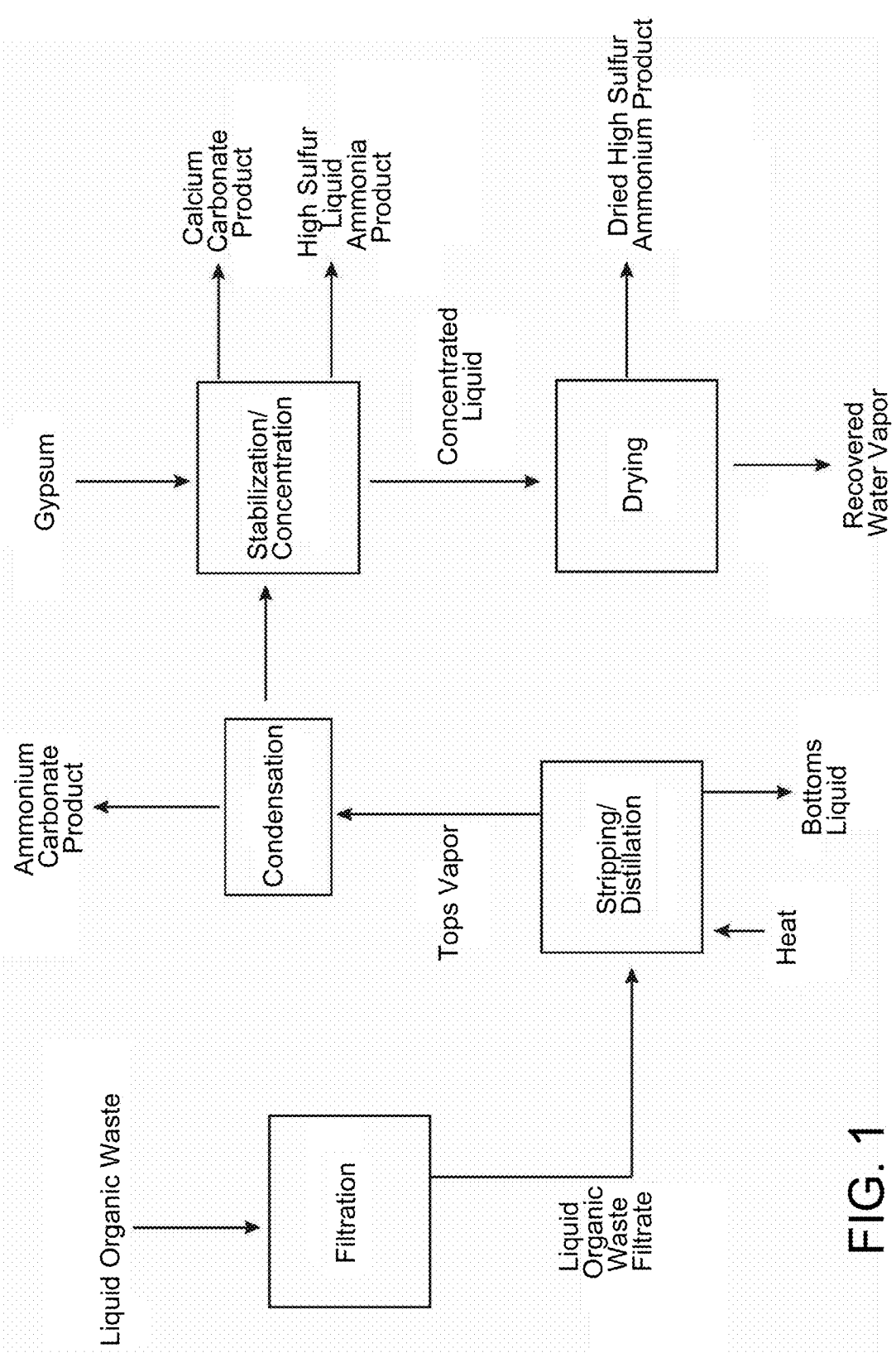
FIG. 1 schematically represents a process of producing stabilized ammoniacal nitrogen products in the forms of a high sulfur liquid ammonia product and a dried high sulfur ammonium product in accordance with certain nonlimiting aspects of the invention.

The following disclosure describes various aspects of systems and processes that are schematically represented in FIGS. 1 through 4. Although the invention will be described hereinafter in reference to particular features/functions schematically identified in the drawings, it should be noted that the teachings of the invention are not limited to these particular features/functions, and the invention does not require all of the features/functions or the interfunctionality represented in the drawings.

FIG. 1 schematically represents general steps that may be included in systems and processes for producing one or more stabilized ammoniacal nitrogen products, including but not limited to an organic liquid fertilizer with high ammoniacal nitrogen and sulfur contents. The term "ammoniacal nitrogen" will be used herein to refer to nitrogen that is contained in ammonium and/or ammonia, and preferably can be provided to a plant in a water-soluble form that is readily available to the plant for use as a nutrient. For convenience, the processing steps will be described as being organized into three sections that include a pre-treatment section, a distillation section, and a product section. However, this should not be interpreted as limiting the scope of the invention as the processes could include additional or fewer steps, and/or the represented steps may be characterized differently and/or include additional or fewer components.

In FIG. 1, the pre-treatment section involves the processing of an organic feedstock, referred to in FIG. 1 as a liquid organic waste, to yield a liquid organic waste filtrate (sometimes referred to herein as an "organic liquid effluent" or simply "effluent") that contains ammonium ($NH_4^+$), or ammonia ($NH_3$), or both ammonium and ammonia. In the example given, solids are removed from the organic feedstock by filtration to produce the liquid organic waste filtrate. In the distillation section, the liquid organic waste filtrate undergoes a distillation process that includes stripping from the liquid organic waste filtrate a gaseous mixture ("Tops Vapor") that contains ammonia, water vapor, and may further include hydrogen sulfide, carbon dioxide, and other volatile compounds, which is concentrated and then undergoes condensation to produce a condensed aqueous ammoniacal nitrogen solution that will typically also contain ammonium bicarbonate and/or ammonium carbonate. An ammonium carbonate product produced during the distillation process may be collected and removed in this section. In the product section, the condensed aqueous ammoniacal nitrogen solution is contacted with a stabilizing agent, which in the nonlimiting embodiment of FIG. 1 is represented as gypsum, to stabilize and concentrate stabilized products resulting from a reaction between the condensed ammonia-containing liquid and the gypsum. The stabilized products are identified in FIG. 1 as a calcium carbonate product, a stabilized ammoniacal nitrogen product referred to as a high sulfur liquid ammonia product, and a concentrated liquid that contains sulfur and ammoniacal nitrogen. Optionally, the concentrated liquid may be dried to produce a dried high sulfur ammonium product, such as ammonium sulfate fertilizer, and a recovered water vapor.

The term "stabilized" as used in reference to stabilized ammoniacal nitrogen products refers to products that are not and do not contain gaseous ammonia, which would be objectionable for safety and environmental reasons, and instead the ammonia and nitrogen are contained in stable compounds. The stabilized products produced in the process of FIG. 1 are preferably organic products, more particularly certified organic products, which as used herein refer to products that are produced in accordance with the standards of the National Organic Program (NOP) developed under the Organic Foods Production Act of 1990 (7 C.F.R. '205)

such that the products can be approved for use as an input in organic crop production. Organic products can also refer to products and fertilizers approved by third party organic certifying agencies using similar guidelines to the National Organic Program.

In view of the desire to produce organic products, it should be understood that the terms "organic feedstock" or "organically derived feedstock" refer to entirely natural source materials having a high ammoniacal nitrogen content from which the liquid organic waste filtrate (effluent) used herein is produced. These natural source materials may include, but are not limited to, animal manure (including cattle manure effluent and hog manure effluent), organic food waste, blood meal, feather meal, guano, bone meal, and wastewater from a variety of food and liquid processing operations. The organic feedstock is preferably anaerobically digested to remove pathogens and convert organic matter into ammoniacal nitrogen. As known in the art, anaerobic digestion is a collection of processes by which microorganisms break down biodegradable material (biomass) within a digester and in the absence of oxygen. Within a digester, various types of bacteria may be used to break down the biomass into byproducts including biogas (e.g., methane, carbon dioxide, etc.) and a liquid effluent, commonly referred to as digestate. Although synthetic substances may not necessarily inhibit or have a significant effect on the processes disclosed herein or their ability to produce high nitrogen fertilizers, to achieve organic certification under the National Organic Program standards, the feedstock is preferably digested while avoiding any contact with any synthetic substances or materials, such as polymers that are commonly used in certain anaerobic digestion processes. Effluents produced from these feedstocks and processed as described herein preferably do not contain any suspended solids greater than 15 microns, and preferably have a total suspended solids (TSS) of about 2.5% or less.

Also consistent with the desire to produce organic products, additives used in the process represented in FIG. 1 are also preferably organic products. As such, the gypsum (a mineral containing calcium, sulfur, oxygen, and water in the form of $CaSO_4{\cong}2H_2O$) used in FIG. 1 is preferably certified as derived from an organic source under relevant organic certifying institutions' standards.

Figure 2:
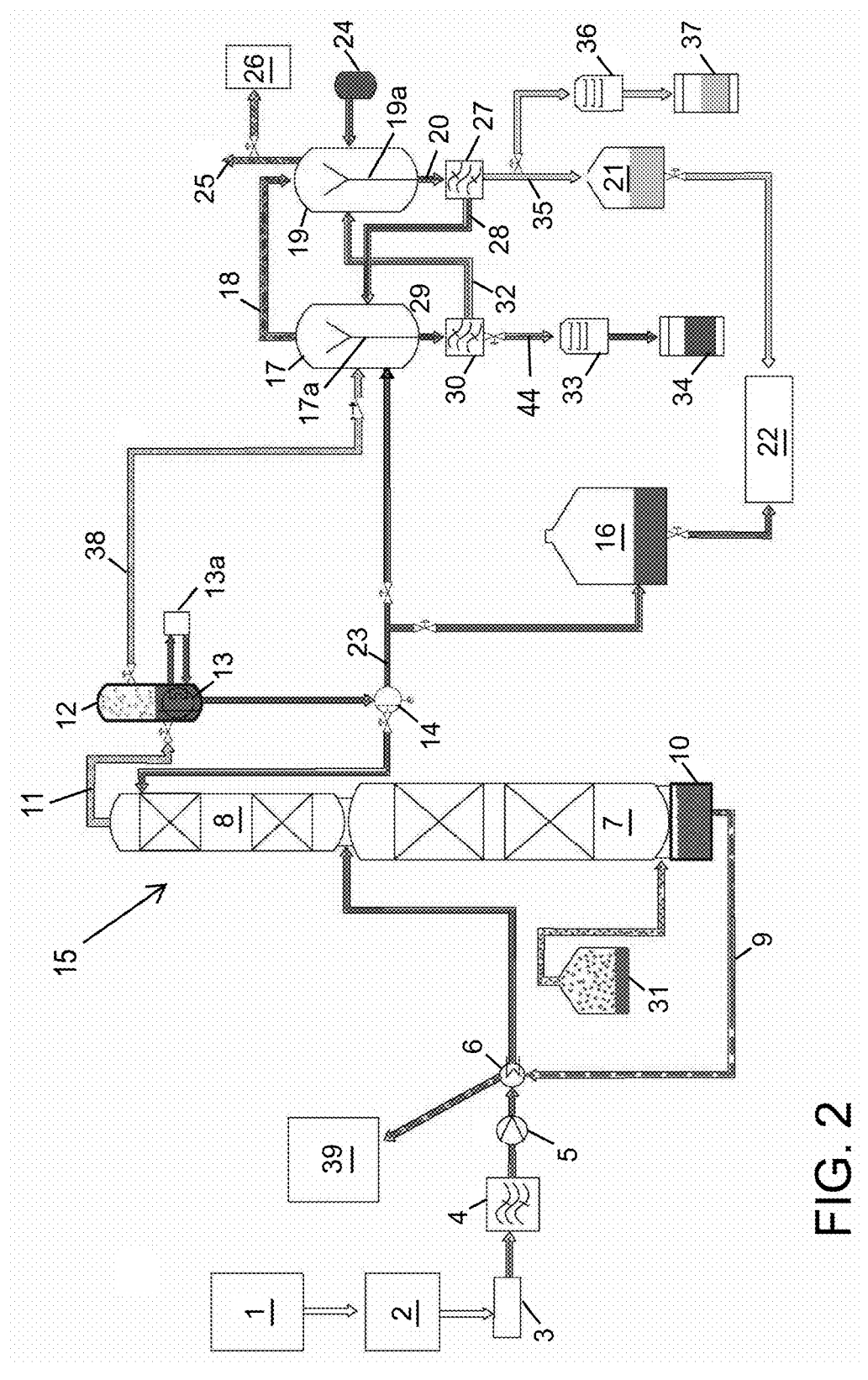
FIG. 2 schematically represents a nonlimiting embodiment of a system for producing an organic stabilized ammoniacal nitrogen product in accordance with certain nonlimiting aspects of the invention.

FIG. 2 schematically represents a nonlimiting embodiment of a system and process for producing an organic stabilized ammoniacal nitrogen product capable of high ammoniacal nitrogen and sulfur contents. In this embodiment, organic waste material is sourced from an animal feedlot 1 and processed in an anaerobic digester 2 to produce a digestate. The digester 2 may be a component of the system represented in FIG. 2 or the digestate produced therefrom may be delivered from a remote operation comprising the digester 2. Alternatively, storage such as a lagoon of liquid manure or a solid mass of manure in which anaerobic digestion can occur may be used instead of the digester 2.

Suspended solids are preferably removed from the digestate, for example, to produce an effluent having the aforementioned maximum suspended solids particles size of not greater than 15 microns and a total suspended solids (TSS) of about 2.5% or less. In FIG. 2, the equipment represented for removing solids from the digestate include a centrifuge 3 and filter unit 4, for example, a fiber press, a screen, or ultrafiltration equipment, though time and gravity in a lagoon may by itself be adequate. A combination of two or more filtration methods is preferred to ensure adequate solids removal. The resulting effluent is likely to be at a temperature of about 100° F. (about 35° C.) and may contain about 1800 ppm of ammonium and/or ammonia, likely nitrogen in forms other than ammoniacal nitrogen, as well as hydrogen sulfide ($H_2S$), carbon dioxide ($CO_2$), other volatile organics, and certain levels of calcium, iron, magnesium, sodium, potassium, phosphorus, manganese, etc.

The effluent is generally the product of a pre-treatment section of the system of FIG. 2, and is transferred with a pump 5 to a means capable of stripping and concentrating ammonia from the effluent. Various means can be used for this purpose, as a nonlimiting example, a distillation tower 15 that forms part of a distillation section of the system. However, other means are foreseeable, as nonlimiting examples, air strippers, thin film evaporators, etc. The effluent is preferably at an elevated temperature when it enters the distillation tower 15. For this reason, a heat exchanger 6 may be used to raise the temperature of the effluent over 90° F. (about 30° C.), for example at least 180° F. (about 80° C.), and more preferably in the range of 180° F. to 200° F. (80° C. to 95° C.).

The distillation tower 15 is preferably a packed media column, although other distillation methods such as sieve trays or valve trays may be used. Within the distillation tower 15, the heated effluent enters a stripping section 7 configured to strip and remove ammonia from the effluent. In the nonlimiting embodiment represented in FIG. 2, a boiler 31 is used to generate steam for this purpose. The steam is preferably at a pressure of at least 15 psi (about 100 kPa) and at least 250° F. (120° C.). The ammonia is removed from the effluent by provoking the effluent to cover the packed media, which increases the surface area of the effluent and accelerates the mass transfer of ammonia from liquid to gas. The gaseous ammonia is concentrated in a concentration section 8 of the distillation tower 15 located above the stripping section 7 before exiting the tower 15 through a conduit 11 at the top of the tower 15.

The gaseous ammonia is entrained in a gaseous mixture (Tops Vapor in FIG. 1) that may further include water vapor, hydrogen sulfide, carbon dioxide, and other volatile compounds. The gaseous mixture is preferably at a temperature of between 150° to 212° F. (35° C. to 100° C.), more preferably 180° to 200° F. (80° C. to 95° C.), most preferably about 190° F. (90° C.). The gaseous mixture preferably has an ammonia concentration above 10%, more preferably above 12%, and most preferably above 15%.

The gaseous mixture is conducted to a condenser 12 where the gaseous mixture is condensed to yield a condensed aqueous ammoniacal nitrogen solution that contains aqueous ammonia, ammonium bicarbonate, and/or ammonium carbonate. The condenser 12 is represented in FIG. 2 as a reflux condensing loop having a cooling coil 13 fed with water, air, or glycol coolant 13a. Though represented as external of the tower 15, condensers incorporated into the top of the tower 15 are also foreseeable. In the embodiment shown, the condenser 12 is configured to recycle a portion of the condensed aqueous ammoniacal nitrogen solution back to the tower 15 through a pump 14 to raise the concentration of ammonia within the concentration section 8 to increase the efficiency of ammonia removal from the effluent. The tower 15 is preferably operated at an ammonia removal efficiency of at least 80%, more preferably 90%, and most preferably 95% or more.

The tower 15 also releases a liquid mixture 9 (bottoms liquid in FIG. 1) that includes, without limitation, condensed steam and heated effluent. The heated liquid mixture 9 exits through a tank 10 located at a lower end of the tower 15 and passes through the heat exchanger 6 to transfer heat to the effluent entering the system. After the heat exchanger 6, the liquid mixture 9 may be removed to a lagoon 39 for storage, for example, if the system is constructed at a Confined Animal Feeding Operation or other operation that has use of the liquid mixture 9.

The distillation tower 15 is preferably constructed to maintain organic process controls as defined by the National Organic Program and/or other relevant institutions. This includes, without limitation, the total absence of synthetic substances in areas that come into contact with the effluent and product as well as precautions to ensure that potential spills or leaks cannot introduce synthetic materials to the system. Additionally, organic process controls are preferably applied to the maintenance, operation, and sanitation of the equipment. Automation may also be used in the system to efficiently regulate the temperature and pressure inside the system.

A fraction of the gaseous mixture that enters the condenser 12 and a fraction of the condensed aqueous ammoniacal nitrogen solution condensed within the condenser 12 are shown in FIG. 2 as being separately transported to a product section of the system, and particularly to a water bath within a tank 17 that contains water and dissolved gypsum, which serves to stabilize the ammonium in the gaseous mixture and allows ammonium in the condensed aqueous ammoniacal nitrogen solution to remain in a liquid form as ammonium carbonate (($NH_4$)$_2CO_3$) when mixed with water. The tank 17 facilitates a reaction between the gypsum and the ammonium carbonate, which as shown in Equation 1 produces calcium carbonate ($CaCO_3$) and, as a stabilized ammoniacal nitrogen product, ammonium sulfate (($NH_4$)$_2SO_4$). In certain embodiments, the gaseous mixture exiting the condenser 12 may be condensed before entering the water bath. In such an embodiment, the gaseous mixture takes the form of a liquid ammonium carbonate solution when it enters the water bath.

$$CaSO_4 \cdot 2H_2O + (NH_4)_2CO_3 \longrightarrow CaCO_3 + (NH_4)_2SO_4 + 2H_2O \qquad \text{Eq. 1}$$

Figure 3:
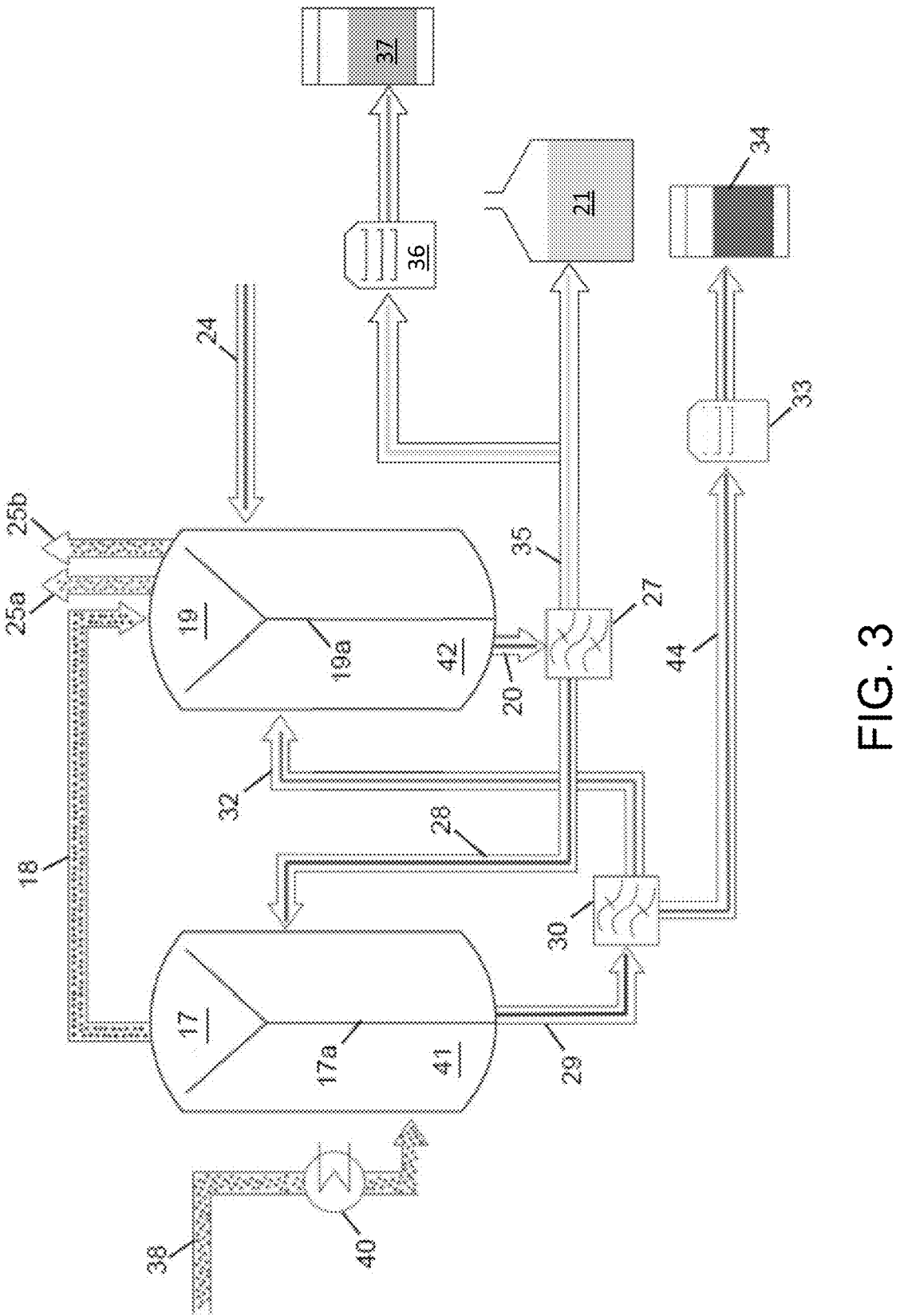
FIG. 3 schematically represents an isolated view of a product section of the system of FIG. 2.

FIG. 3 represents an isolated view of the product section of the system of FIG. 2. As seen in FIGS. 2 and 3, the gaseous mixture drawn from the condenser 12 is transported through a conduit 38 and then a heat exchanger 40 into the water bath of the tank 17. The concentration of ammonia in the gaseous mixture at this point in the system preferably does not exceed 18% by weight. As represented, the system includes at least a second tank 19 connected to the first tank 17. Each tank 17 and 19 is preferably pressurized and contains a mechanical mixing mechanism 17a and 19a to mix the gypsum with the dissolved ammonium carbonate of the condensed aqueous ammoniacal nitrogen solution (collectively referenced by 41 and 42 in tanks 17 and 19, respectively) inside the tanks 17 and 19.

The first tank 17 contains a relatively small amount of gypsum, which quickly reacts with the ammonium carbonate in the condensed aqueous ammoniacal nitrogen solution. The first tank 17 also includes a small amount of ammonium sulfate and a small amount of calcium carbonate as a result of the reaction of Equation 1. The calcium carbonate formed in the tank 17 exits the tank 17 via a circulation stream 29 from which the calcium carbonate is removed with a filter 30. The resulting filtered calcium carbonate stream 44 may be dried, for example, with a dryer/evaporator 33, to produce dried cakes thereof to be stored in a storage vessel 34. A filtrate slurry 32 containing the remaining ammonium carbonate and ammonium sulfate originally in the circulation stream 29 enters the second tank 19, which contains a higher concentration of gypsum than the tank 17 as a result of gypsum being directly added to the tank 19 from a gypsum source 24. In addition, excess gases 18 from the first tank 17 may be diverted to the second tank 19.

Within the second tank 19, the gypsum reacts quickly with the ammonium carbonate, so that the reaction products within the tank 19 are primarily ammonium sulfate and calcium carbonate. The resulting slurry stream 20 containing ammonium sulfate, gypsum, and calcium carbonate exits the tank 19, and a stabilized ammoniacal nitrogen product 35 (primarily an ammonium sulfate solution) is removed from the slurry stream 20 with a filter 27 before being sent to the concentration stages of the process. In FIGS. 2 and 3, the stabilized ammoniacal nitrogen product 35 may be transported to a liquid storage tank 21 or further dried with a dryer/evaporator 36 to produce solid ammonium sulfate crystals and stored in storage vessel 37. A slurry 28 containing gypsum, calcium carbonate, and ammonium sulfate is also shown as being drawn from the second tank 19 and transported to the first tank 17 to be used in the reactions that occur there. Excess gases 25 such as carbon dioxide ($CO_2$) 25a and hydrogen sulfide ($H_2S$) 25b may be removed from the second tank 19. Optionally, a production system 26 may be included to produce iron sulfide from the excess gases 25. The stabilized ammoniacal nitrogen product 35 collected in the tank 21 may be packaged as a liquid ammonium sulfate solution fertilizer 22. Alternatively or in addition, a fraction of the condensed aqueous ammoniacal nitrogen solution produced by the condenser 12 may be collected in a storage tank 16 and packaged as a liquid fertilizer 22.

Figure 4:
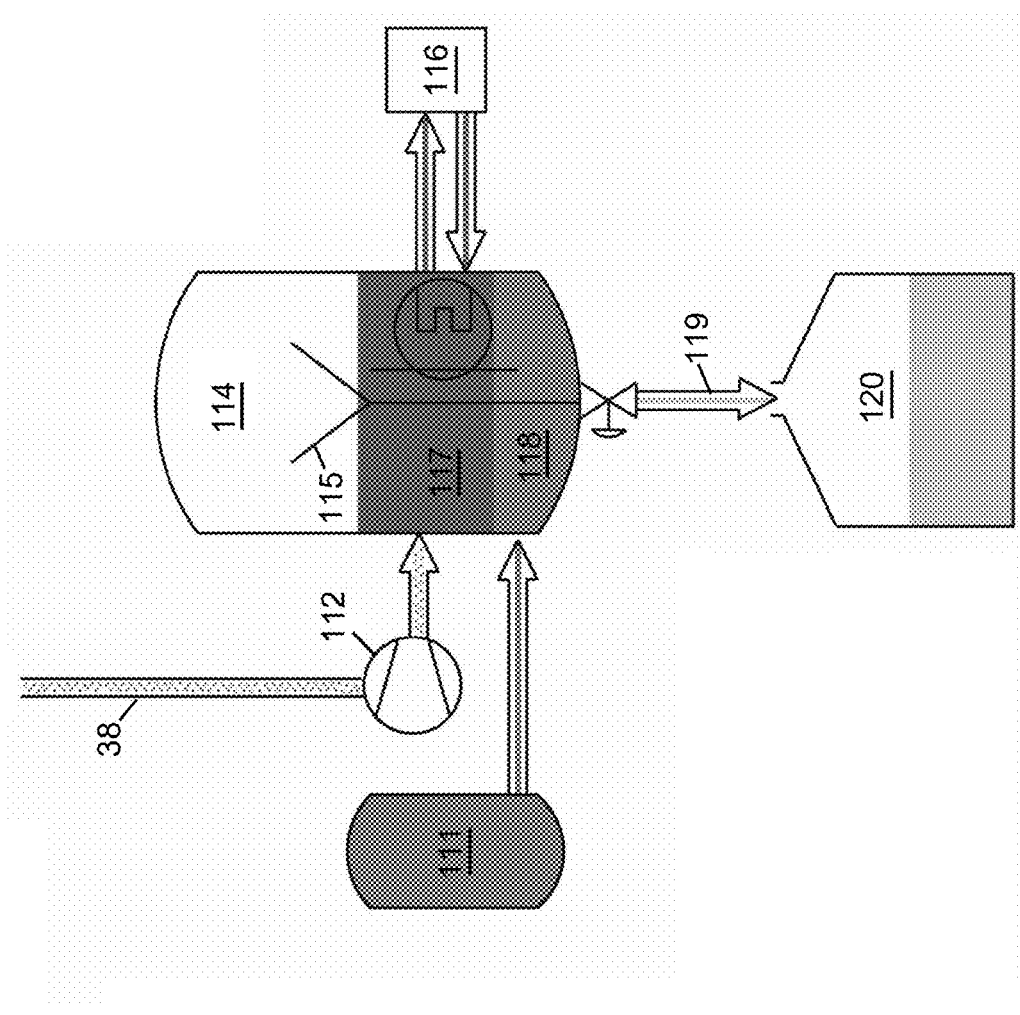
FIG. 4 schematically represents an isolated view of an alternative embodiment of the product section of the system of FIG. 2 in accordance with certain nonlimiting aspects of the invention.

FIG. 4 represents an isolated view of an alternative embodiment of the product section of the system of FIG. 2. In this embodiment, represented as a batch process, the gaseous mixture transported by the conduit 38 is drawn through a compression pump 112 and delivered to a single mixing tank 114, instead of the series of tanks 17 and 19 shown in FIGS. 2 and 3. The mixing tank 114 is preferably a pressurized tank and contains a mechanical mixing mechanism 115 to mix the gaseous mixture with gypsum from a gypsum source 111 and dissolved ammonium carbonate of the condensed aqueous ammoniacal nitrogen solution drawn from the condenser 12. The condensed aqueous ammoniacal nitrogen solution and gypsum are respectively represented by 117 and 118 in the tank 114. The temperature in the tank 114 is preferably 90° F. to 130° F. (about 30° C. to 55° C.), more preferably 100° F. to 120° F. (about 35° C. to 50° C.), and most preferably about 105° F. (about 40° C.). The mechanical mixing in the tank 114 is preferably maintained at about 200 RPM, preferably for a duration of 4 to 12 hours, more preferably 6 to 10 hours, and most preferably about 8 hours. The batch process is not necessarily limited to a single tank 114 and additional embodiments can include multiple vessels with mechanical mixing in each. Optionally, a water-cooled condenser 116 may be coupled to the tank 114. A stabilized ammoniacal nitrogen product (primarily an ammonium sulfate solution) produced in the tank 114 may be removed and stored in a liquid storage tank 120, from which it may undergo further processing such as drying as described in reference to FIGS. 2 and 3.

In all embodiments of the water bath (tanks 17, 19, and 114), the resulting liquid is removed and heated to increase the concentration of ammonia and sulfur in the liquid. Although not shown, the ammonium sulfate solution can be diverted to a mechanical dryer to evaporate all the water off the product to create solid ammonium sulfate crystals using components similar to those represented in FIG. 3, which can be used as a solid ammonium sulfate fertilizer. The drying process preferably creates water vapor, which can be diverted for use in the earlier stages of the process, preferably the distillation section.

The systems and processes described above produce a liquid or solid organic fertilizer containing soluble ammoniacal nitrogen. The majority of organic fertilizers currently commercially available contain relatively low levels of nitrogen in forms that are slowly released over the course of weeks or even months. In contrast, the ammoniacal nitrogen in the products produced by the processes described herein is immediately available to plants/crops upon contact with the fertilizer.

The liquid fertilizer produced preferably has a pH between 4.5 and 7.5, most preferably about 5 to about 6. The pH of the liquid fertilizer can additionally be stabilized with citric acid in a further embodiment, a natural additive that does not disqualify the fertilizer from qualifying as certified organic. The ammoniacal nitrogen in the liquid fertilizer is preferably in concentrations between 4 and 9%, more preferably 6 to 8% and, most preferably about 7%. The sulfur in the liquid fertilizer is preferably in a concentration of 4.5 to 10%, more preferably 7 to 9%, and most preferably about 8%.

The dry fertilizer produced in the embodiments containing a dryer may contain up to about 21% nitrogen and up to about 24% sulfur, and possibly more. The higher nitrogen content in the dry fertilizer may lead organic certifying agents to require the fertilizer to be mixed with compost or only be used to supply 20% of a crop's nitrogen needs during a single harvest.

The fertilizer produced is not necessarily an ammonium sulfate solution. When the nitrogen and sulfur contents are outside of a ratio of about 7:8, the solution can be considered ammoniacal nitrogen with a high sulfur content. Using gypsum to produce ammonium sulfate is similar to the use of gypsum in a composting operation to prevent nitrogen loss. The increase in sulfur in the solution is an added bonus, providing an additional nutrient to the nitrogen solution that is widely sought after in organic farming. Currently, very few fertilizers commercially available offer significant sulfur content.

The fertilizer produced is preferably produced in accordance with the standards of the National Organic Program and other relevant organic certifying institutions in order for the fertilizer to be approved as an input in organic crop production. The fertilizer produced is concentrated and easy to transport compared to other organic fertilizers on the market including compost, feather meal, urea, and other products, reducing the carbon footprint of organic crop production. The dry fertilizer can also be mixed with current composts and other fertilizers on the market, necessitating smaller amounts of compost and other fertilizers to be transported.

The fertilizer produced also sequesters carbon dioxide in the form of calcium carbonate during the ammonium sulfate production process. The carbon dioxide sequestered would otherwise be released into the atmosphere if the effluent used in the system was disposed of otherwise. The carbon dioxide sequestered amounts to roughly 1.5 pounds (about 0.7 kg) of carbon per pound (about 0.5 kg) of nitrogen in the fertilizer. This equates to roughly 1.5 carbon credits per 880 gallons (about 10,900 L) of fertilizer applied.

In investigations leading to aspects of the present invention, the above-noted process was used in the production of dry ammonium sulfate using an automated 24 foot (about 7.3 m) tall distillation tower connected to a 110,000 BTU (about 116,056 kJ) boiler. Specifically, 0.3 gallons (about 1.14 L) per minute of digested dairy cow manure effluent containing 1800 ppm ammonia filtered to 15 microns was preheated to 150° F. (about 65° C.) using a heat exchanger and then further heated to 180° F. (about 80° C.) using another heat exchanger before entering the tower. The second heat exchanger used heat captured from the Bottoms exiting the distillation tower at approximately 210° F. (about 100° C.).

The 180° F. (80° C.) effluent was pumped to the distillation tower to a point 16 feet (about 4.9 m) high on the tower. The tower was a packed media distillation column with a six inch (about 15 cm) diameter in the ammonia stripping portion. Live steam from the boiler was injected into the tower at 12 to 15 psi (about 82 to about 104 kPa) above the bottoms collection tank at the base of the tower. The ammonia from the effluent was stripped in the lower 16 feet (about 4.9 m) of the tower and then concentrated in the upper 8 feet (about 2.5 m) of the tower. The concentration portion had a diameter of 6 inches (about 15 cm) at the feed line to 2 inches (about 5 cm) at the top. $CO_2$ and $H_2S$ was also stripped from the manure in the column. A mixture of ammonia, $CO_2$, $H_2S$, and water vapor exited the top of the tower as a gaseous mixture at approximately 180° F. (about 80° C.).

The concentration of the ammonia occurred using internal reflux condensation in jacketed cooling cans in the tower. Cold groundwater was run through the jacketed portions and the flow of the water was managed by control valves. The distilled gaseous mixture was piped into a multi-staged gypsum slurry bath resulting in the production of ammonium sulfate and calcium carbonate slurry. The gypsum bath was maintained at approximately 110° F. (about 43° C.). The calcium carbonate was filtered out of the slurry resulting in an ammonium sulfate liquid. The calcium carbonate was dried resulting in a calcium carbonate cake.

Analysis of the liquid ammonium sulfate product concluded that the product contained at least 3% ammoniacal nitrogen and at least 3.4% sulfur. A portion of the liquid ammonium sulfate product was evaporated and dried to produce dry ammonium sulfate crystals. Lab analysis showed that there was more than an 80% ammonia removal efficiency from the effluent.

While the invention has been described in terms of specific embodiments, it is apparent that other forms could be adopted by one skilled in the art. For example, the physical configuration of the system could differ from that shown, and materials and processes/methods other than those noted could be used. Therefore, the scope of the invention is to be limited only by the following claims.

The invention claimed is:

1. A process comprising:

providing an organic feedstock that contains at least one nitrogen compound;

removing solids from the organic feedstock to produce an organic liquid effluent that contains at least one of ammonium and ammonia;

stripping and concentrating ammonia from the organic liquid effluent to produce a gaseous mixture that contains water vapor, carbon dioxide, and entrained gaseous ammonia, the stripping and concentrating step being a distillation process performed in a distillation tower comprising a stripping section and a concentration section, the stripping section containing media through which the organic liquid effluent flows downward and steam is caused to flow upward, the organic liquid effluent and the steam contacting the media to remove the ammonium and/or ammonia from the organic liquid effluent and yield the gaseous mixture that contains the water vapor, the carbon dioxide, and the entrained gaseous ammonia, after which the gaseous mixture flows through the concentration section above the stripping section and the entrained gaseous ammonia is concentrated in the concentration section;

cooling the gaseous mixture to produce a condensed aqueous ammoniacal nitrogen solution comprising one or more of aqueous ammonia, ammonium bicarbonate, and ammonium carbonate, whereby the carbon dioxide in the gaseous mixture is captured in the condensed aqueous ammoniacal nitrogen solution;

recycling a portion of the condensed aqueous ammoniacal nitrogen solution through the concentration section of the distillation tower, the portion of the condensed aqueous ammoniacal nitrogen solution raising the concentration of ammonia within the concentration section and increasing the efficiency of removal of the ammonium and/or ammonia from the effluent; and contacting the condensed aqueous ammoniacal nitrogen solution with a stabilizing agent to cause a reaction therebetween to produce at least a stabilized ammoniacal nitrogen product and calcium carbonate, whereby the carbon dioxide captured in the condensed aqueous ammoniacal nitrogen solution is sequestered in the calcium carbonate.

2. The process of claim 1, wherein the condensed aqueous ammoniacal nitrogen solution contains ammonium carbonate, the stabilizing agent contains gypsum, and the stabilized ammoniacal nitrogen product contains sulfur.

3. The process of claim 2, wherein at least some of the sulfur contained in the stabilized ammoniacal nitrogen product is in the form of ammonium sulfate.

4. The process of claim 2, wherein the reaction between the condensed aqueous ammoniacal nitrogen solution and the stabilizing agent further produces calcium carbonate.

5. The process of claim 1, wherein the organic feedstock is derived from organic animal manure or organic food waste.

6. The process of claim 5, further comprising preparing the organic feedstock in an anaerobic digester, an anaerobic solid mass, or an anaerobic lagoon.

7. The process of claim 1, further comprising drying the stabilized ammoniacal nitrogen product to produce a dried ammonium product that contains sulfur.

8. The process of claim 7, wherein the dried ammonium product is ammonium sulfate.

9. The process of claim 1, further comprising preparing the organic feedstock by causing organic animal manure and/or organic food waste to undergo anaerobic digestion, wherein the carbon dioxide is a byproduct of the anaerobic digestion of the organic feedstock.

10. The process of claim 1, further comprising applying the stabilized ammoniacal nitrogen product and the calcium carbonate as a fertilizer.

11. The process of claim 1, wherein the at least one nitrogen compound comprises ammonia.

12. The process of claim 1, wherein the organic liquid effluent contains ammonium and ammonia.

13. The process of claim 1, wherein the removing of the solids from the organic feedstock comprises a centrifuge process and/or a filtering process.

14. The process of claim 1, wherein the recycling of the portion of the condensed aqueous ammoniacal nitrogen solution comprises obtaining the portion from an external reflux loop system that is external of the distillation tower or from an internal reflux loop system that is within the distillation tower.

15. The process of claim 1, further comprising increasing the temperature of the organic liquid effluent to an operating temperature prior to the stripping and concentrating step.

16. The process of claim 1, wherein the media is packed media or trays.

17. The process of claim 1, wherein the cooling of the gaseous mixture is performed with a reflux loop system that also performs the recycling of the portion of the condensed aqueous ammoniacal nitrogen solution back to the distillation tower to increase the concentration of ammonia in the distillation tower.

* * * * *